INVENTOR
Robert S. Peterson
ATTORNEY

United States Patent Office
3,538,408
Patented Nov. 3, 1970

3,538,408
SYNCHRONOUS MOTOR TORQUE
COMPENSATOR CONTROL
Robert S. Peterson, Amherst, Williamsville, N.Y., assignor to Westinghouse Electric Corporation, Pittsburgh, Pa., a corporation of Pennsylvania
Filed Oct. 1, 1968, Ser. No. 764,091
Int. Cl. H02p 7/36
U.S. Cl. 318—174         12 Claims

ABSTRACT OF THE DISCLOSURE

A torque compensator control system for a synchronous motor wherein a controllable field current supply source responds to signals representing motoring load and regenerating loads to increase the field excitation with increase of motor load, the system having a threshold point for both negative and positive loads above which the field excitation slope characteristics are further increased.

BACKGROUND OF THE INVENTION

Excessive load peaks often cause a synchronous motor to pull out of synchronism. To avoid this, it is necessary to increase the DC field excitation. It has been proposed to increase the field excitation as a function of AC line current or line KVA (KVAR compensator control or vector summing compensator control respectively). If the synchronous motor field excitation was increased too much as a function of line current or line KVA, the KVAR compensator would "hang up" at a large field excitation current causing the synchronous motor to generate capacitive KVARS continuously which would overheat the synchronous machine and also cause the AC line voltage to rise at light synchronous motor loads. The reason for the excitation "hang up" is because the capacitive synchronous motor KVARS increases with increase in line current, which in turn through the KVAR compensator control will always maintain a large field excitation. To prevent field current "hang up," the field excitation was not increased as much with increase in synchronous motor line current or line KVA which resulted in reducing the pull out torque capability of the synchronous machine.

To avoid the "hang up" a system was devised wherein the synchronous motor field excitation was increased as a function of motor power when the motor was motoring. However, in this system, during regeneration, the synchronous motor field current was regulated to a constant value below the rated field current of the synchronous motor. The reduced field current during regeneration reduced the pull-out torque capacity of the synchronous motor, thus increasing the possibility of the motor pulling out on negative peak loads. Also, while this previously proposed system was able to prevent pull-out at very high motoring peak loads, it undesirably over-excited the motor for normal peak loads.

SUMMARY OF THE INVENTION

In accordance with one embodiment of the invention field excitation of a synchronous motor is increased as a function of increasing motor load for both motoring and regenerating modes, thus providing pull-out protection at peak motoring (positive) loads and peak regenerating (negative) loads. A further feature of the invention, a threshold or spill-over circuit, increases even further the excitation slope (field excitation/motor load) when the motor load exceeds a predetermined value. This feature provides additional field excitation for very high peak load excursions which in turn gives the motor a higher pull-out torque and yet does not over-excite the motor for normal peak loads. The invention permits better control of the synchronous motor excitation characteristics, thus reducing AC line voltage variations.

In accordance with one embodiment of the invention, separate channels connected to a common load detector develop signals representing positive motor loads and negative motor loads, the channel for motoring load signals having a faster time response than the channel for regenerating load signals. A controllable DC power source coupled to the two signal channels, provides field excitation to the motor in response to and in accordance with the motor load signals. Both channels have threshold circuits having predetermined spill-over points for even further increasing the excitation slope of the motor in the higher peak load ranges.

It is therefore an object of the present invention to provide an improved system for increasing the pull-out torque capacity of a synchronous motor for both motoring and regenerating modes.

Another object of the invention is a synchronous motor field control system which will provide additional field excitation for large peak load excursions and yet will not over-excite the synchronous motor for normal peak loads.

Other and further objects and advantages of the invention will become apparent from the following detailed description taken in connection with the drawings, wherein a preferred embodiment of the invention is illustrated.

DESCRIPTION OF THE PREFERRED EMBODIMENT

Figure 1:
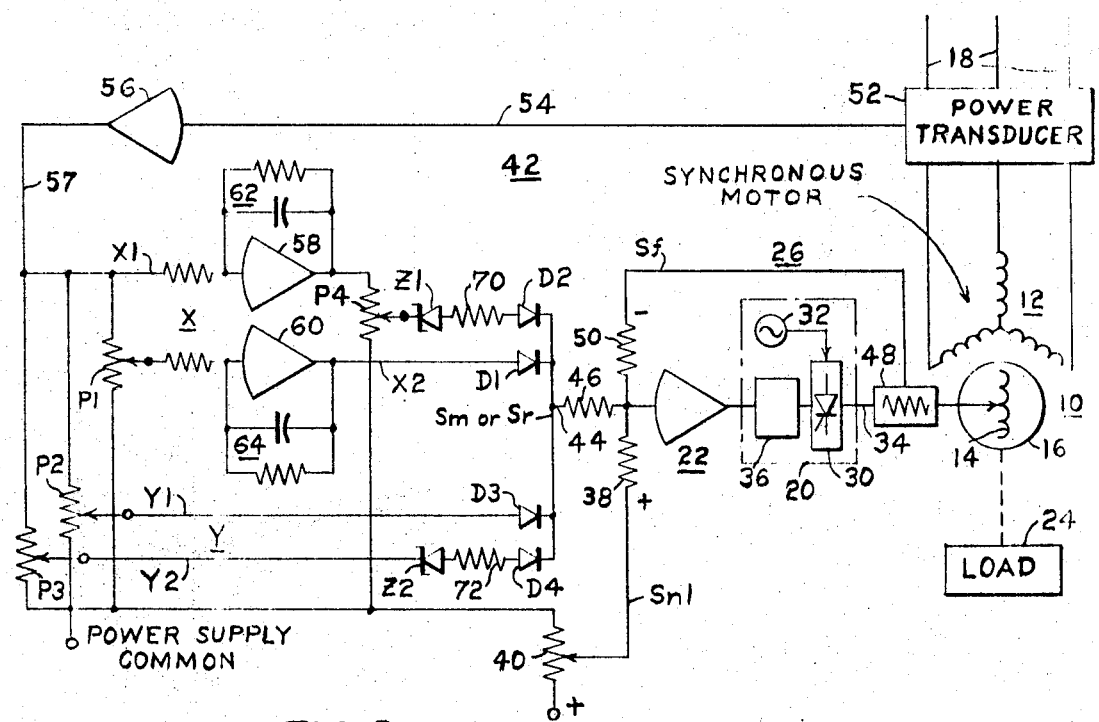
FIG. 1 is a diagram, principally in "single line" form, of a synchronous motor system embodying the invention.

The system in FIG. 1 includes a synchronous motor 10 with an AC armature winding 12 and a DC field winding 14. Although the positions may be interchanged, the field winding is shown as carried by the rotor 16 of the motor, while the armature winding is carried by the stator of the machine. The armature winding 12 receives AC power from a suitable supply source through supply lines 18. DC power to the field winding 14 is supplied from a DC source 20 under the control of a current controller 22. Rotor 16 is shown mechanically coupled to a load 24 to be driven by the motor.

The power supply source 20 and the current controller 22 are part of a field current regulating loop 26 which also includes a negative feedback line 28. By way of example, the DC supply source 20 is shown as including a thyristor controlled AC to DC converter 30 with its AC input connected to a suitable AC source 32, and its DC output connected through an output line 34 to the field winding 14. The conduction times of the thyristors in the converter 30, and consequently the output of the converter, are controlled by a firing circuit 36 in accordance with the output of the current controller 22.

The current controller 22 preferably, but not necessarily, has a lead-lag transfer function such that the lead time constant cancels the largest parasitic time constant in the synchronous motor field if an interposing exciter is not used. If an interposing exciter is used, the lead time constant cancels the exciter time constant. The lead-lag type controller provides a four to five times faster time response for small values of field current references which do not saturate the thyristors of converter 30 (or exciter if used) than a proportional plus integral (PI) field current controller.

By way of example, the controller 22 is shown as a summing operational amplifier. To simplify the drawing, the necessary feedback networks associated with the amplifier for providing a transfer function having lead-lag elements are not shown, especially since techniques for providing desirable lead-lag characteristics to operational amplifiers are well known.

A reference signal $Sn1$ representing desired no-load field current is applied to the input of controller 22 through a summing buffer resistor 38 from a suitable source represented by an adjustable potentiometer 40 which may be connected across the power supply (not shown) for the various operational amplifiers included in this system. A signal $Sm$ or $Sr$, representing motoring or regenerating motor load as the case may be, is supplied by a torque compensator control system 42 to the current controller 22 through an output line 44 and a summing buffer resistor 46. A field current signal $Sf$ representing field current is generated by a current sensor 48, for example, a resistor in the line 34, and is applied to controller 22 through feedback line 28 and a summing buffer resistor 50. The feedback signal $Sf$ is in negative feedback relation to the reference signal $Sn1$.

The torque compensator control 42 includes a suitable power detector or transducer 52 connected in the supply lines to the motor armature 12 to provide signals that are a function of the power taken by the motor 10, thereby to supply along a line 54 signals representing the load on the motor 10 for the motoring mode or the regenerating mode as the case may be. The signal on line 54 representing motoring load will be of one polarity, for example negative, while the signal representing regenerating load on the motor will be of the opposite polarity. It is understood that power flow for motoring load is in one direction; while power flow for regenerating load is in the opposite direction. It is usual and convenient to refer to motoring load as positive load, and to regenerating load as negative load on the motor. The power detector 52 may for example be any suitable watt transducer providing output signals that are proportional to the true power (volt-amperes x cos-phase angle) taken by the motor, for example, a Hall generator type of watt transducer. Suitable examples of Hall effect watt transducers are disclosed in U.S. Pats. Nos. 3,195,016 and 3,054,952.

The signals on line 54 are amplified by any suitable amplifier 56, for example an operational amplifier having a gain adjusting feedback network. Depending on the polarity of the output signal from amplifier 56, that is, depending on whether the signal is a motoring signal or a regenerating signal, the signals are processed through or passed through one of two channels X or Y to the output line 44 for application to the input of current controller 22. Channel X formed from subchannels X1 and X2, develops the signals $Sr$ representing motor load when the motor is regenerating. Channel Y formed from channels Y1 and Y2 develops the signals, $Sm$ representing motor load when the motor is motoring.

Since the function of the torque compensator control 42 is to increase field excitation as a function of increasing motor load, regardless of whether the load is motoring or regenerating load, the signals $Sm$ and $Sr$ should be of the same polarity to have the same effect on the current controller 22. For this reason, one or the other polarity signals from the transducer 52 should be inverted so that for any given power level, either motoring or regenerating, the signals $Sm$ and $Sr$ will have the same polarity. The particular one of channels X and Y in which the signal inversion takes place, depends upon the end signal desired and upon the polarity relationships between the cascaded sections of the entire system. In the particular example shown, the signal inversion takes place in channel X which develops the signals $Sr$ proportional to the regenerating load on the motor, and is accomplished by employing signal inverting operational amplifiers 58 and 60 in subchannels X1 and X2.

In order to prevent systems oscillation during negative peak loads, the response of channel X to regenerating motor load signals is delayed by introducing delay in channel X for example by means of delay feedback networks 62 and 64 connected to amplifiers 58 and 60 respectively. The signal for subchannel X1 is taken directly from the output line 57 of amplifier 56, while the signal for channel X2 is taken from a potentiometer P1 connected across the output of amplifier 56. The signal for channel Y1 is taken from a potentiometer P2 connected across the output of amplifier 56, and the signal for subchannel Y2 is taken from a potentiometer P3 connected across the output of amplifier 56.

The output of subchannel X2 is the output of amplifier 60 passed through a diode D1. In subchannel X1, output line 44 is connected to the output of amplifier 58 through a suitable threshold circuit for example, including a diode D2, a resistor 70 and a Zener diode Z1 coupled to the arm of a potentiometer P4 connected across the output of amplifier 58. Subchannel X1 will of course produce no output on line 44 in response to proper polarity input signals on the line 57 until the Zener diode Z1 breaks down. The parameters of subchannel X2 are so selected that the threshold value (Zener breakdown voltage) of the Zener diode will be reached to break down the diode when the regenerating load on the motor reaches a predetermined value or spill-over point.

The signal for subchannel Y1 taken from potentiometer P2 connected across the output of amplifier 56 is applied to the output line 44 through a diode D3. Channel Y2 connected to potentiometer P3 across the output of amplifier 56 is a threshold circuit, and, by way of example, includes a threshold device such as the Zener diode Z2, a series resistor 72 and a diode D4.

Subchannels X1 and Y2 may be referred to as spill-over or threshold circuits since they will produce no output on line 44 until the Zener diode in the respective circuit breaks down. The breakdown of the threshold device will occur at a predetermined spill-over or threshold value of the motor load as determined by the gain of the signal applied to the Zener diode. The gain of the signal applied to Zener diode Z1 is adjusted by adjusting potentiometer P4. It should be understood that the motor load spill-over point may be changed by selection or adjustment of the breakdown voltage of Zener diode Z1. Adjustment of the spill-over load point in subchannel Y2 is effected by adjusting potentiometer P3, and may also be changed as heretofore indicated by changing the Zener breakdown voltage of the Zener diode Z2. The latter may be effected by selecting from a plurality of different valued Zener diodes.

If, for example, the Zener (break down) voltage of the Zener diode Z2 is 10 volts and the desired spill-over point is 250% of rated load, then potentiometer P3 should be adjusted to put out about 4 volts when the motor load is 100% rated load. This is simply calculated from $$E_z/E_p = P_s/100$$

wherein $E_z$=Zener voltage
$E_p$=voltage at contact arm of potentiometer P3, and
$P_s$=spill-over point in percent rated load.

The same procedure is applicable in determining the setting of potentiometer P4 for the desired spill-over point in percent of rated load for the regenerating mode.

In the following description of operation, it is assumed that increasing negative output from controller 22 applied to the firing circuit 33 will increase the field current on line 34, and vice versa. It is further assumed that amplifiers 56, 58, 60 and 22 are inverting amplifiers. Most operational amplifiers today are transistorized inverting, bidirectional output amplifiers. Thus it is assumed for the operational example that amplifiers 56, 58, 60 and 22 are transistorized, inverting, bidirectional output amplifiers.

Figure 2:
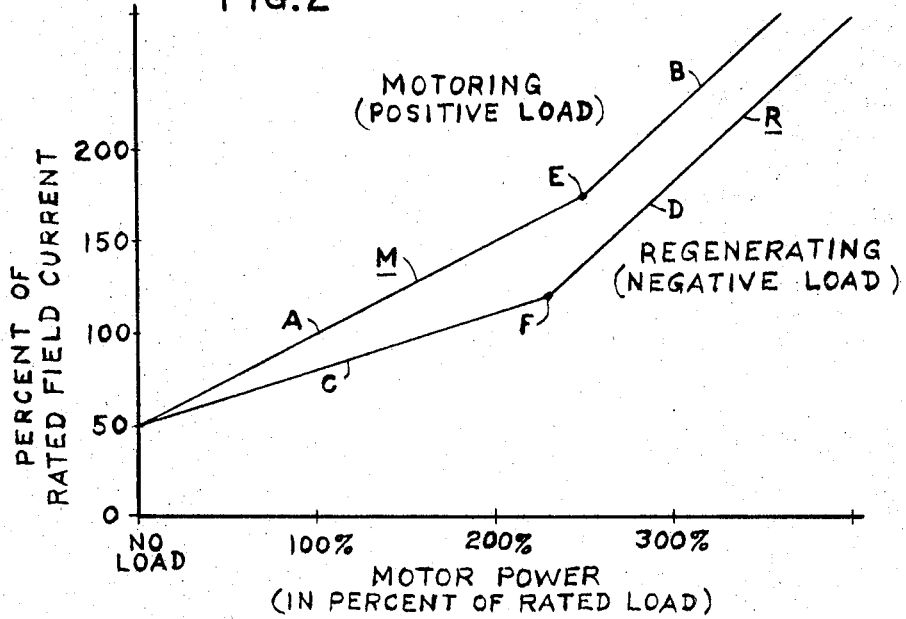
FIG. 2 is a chart with curves illustrating the excitation slope characteristics of the system in FIG. 1.

The chart in FIG. 2 may be referred to as an aid in understanding the operation of this system in FIG. 1. In this chart, curve M, composed of elements A and B, is an example of a Field Current-versus-Positive (motoring) Load characteristic for the system of FIG. 1, while curve R, composed of elements C and D, is an example of a Field Current-versus-Negative (regenerating) Load characteristic for the system.

Element A of curve M is contributed by subchannel Y1, while element B of that curve is contributed by subchannels Y1 and Y2. Element C of curve R is contributed by subchannel X2, while element D of that curve is contributed by subchannels X1 and X2.

The slope of element A of curve M is determined by the adjustment of potentiometer P2. The point E is the spill-over point in curve M, and the slope of element B is determined by the setting of potentiometer P3. It should be noted that the setting of potentiomeer P3 determines both the break point E and the slope of element B. The slope of element C of curve R is determined by the setting of potentiometer P1, while the slope of element D is determined by the setting of potentiometer P4. The spill-over point F in curve R is also determined by the setting of potentiometer P4.

Now assume that the motor 10 is running with no load with about 50% of rated field current supplied to the DC field 14, and that for positive motor loads the power detector 52 provides a signal of negative polarity on line 54. With the motor running, but without load, signals from the power transducer 52 are small and have such a small effect on the field current that these effects may be ignored for practical purposes. It may be noted that the no-load field current is determined by the adjustment of the no-load reference source 40. This is set high enough, for example 50% of rated field current, so that when the torque compensator control demands more field current, it can be raised toward the demand level fast enough to prevent pull-out.

As positive or motoring load increases (as by loading the motor shaft), an increasing negative signal is applied to the input of amplifier 56 which translates it to a positive signal on line 57. As a result, a positive polarity signal Sm is applied through subchannel Y1 and output line 44 to the input of controller 22, thus to increase negative polarity output of controller 22, and thereby to increase the current supplied through line 34 to the field 14. The field current increases as a function of increasing motoring load along the A portion of curve M.

As hereinbefore noted, the field excitation slope during the A portion is determined by the setting of potentiometer P2, for the gain of the signal applied to subchannel Y1. The spill-over point E is approximately at 250% rated load, and loads between 100% rated load and the spill-over point may be considered normal peak motoring loads, and for any such load the field requirements will be taken care of through channel Y1. If the motoring load should exceed the spill-over point (example 250%), Zener diode Z2 will break over and additional positive current will be applied through resistor 46 to the current controller, thus to change the excitation slope of the system to that indicated in the B portion of curve M. Motoring loads along the B portion of curve M, that is, motoring loads above the spill-over point E may be considered large excessive power peaks as contrasted to the normal excessive power peaks in the range between 100% and the spill-over point. It may be noted that since amplifiers 58 and 60 are inverting amplifiers, the positive output of amplifier 56 during motoring loads will result in negative outputs at amplifiers 58 and 60 which will be blocked by diodes D1 and D2, so that the output line 44 will be unaffected by channels X1 and X2 during motoring loads.

Now consider operation in the regenerating mode, that is, when the motor is regenerating. As the regenerating load increases, it provides an increases positive polarity output signal on line 54 into the input of amplifier 56 thus producing a negative polarity output signal on line 57 that is applied to channel X. As the regenerating signal increases, the output from channel X2 provides an increasing positive polarity signal through diode D1 and line 44 and into the input of controller 22, thus to increase the field current applied through line 34 into the field 14. The field current increases as a function of increasing regenerating load. Starting from a no-load condition the system follows the slope of the C portion of curve R as the regenerating load increases. Thus, the excitation slope for regenerating loads is that of the C portion of curve R. The spill-over point F is shown by way of example as approximately 230% of rated regenerating load. Regenerating loads between 100% and the spill-over point (example 230%) may be considered normal peak loads.

If the regenerating load should exceed the spill-over point (example 230%) the Zener diode Z1 will break down, resulting in additional positive polarity output from subchannel X1 into the output line 44 and into the current controller 22, thus to increase the field excitation so that it follows the slope indicated by the D portion of curve R. Regenerating loads lying above the spill-over point F, that is, along the D portion of curve R, may be referred to as large peak loads as contrasted to the normal peak loads between 100% and the spill-over point.

In the system described, any increase of motor load, positive or negative, results in a field forcing action to increase the field excitation thereby to increase the pullout torque capacity, thus to prevent pullout at either normal peak loads or large peak loads. Because of the different excitation slopes for normal and large peak loads, the machine will not be over-excited for the normal peak loads. It may be noted that the negative output of amplifier 56 resulting from regenerating loads will not pass through channel Y due to diodes D3 and D4.

From the chart in FIG. 2, it may be seen that operation along the A portion of curve M provides a particular ratio of field current to positive motor load, and that when subchannel Y2 comes into play above the spill-over point E, the ratio of field current to positive motor load is increased. The same comparisons apply to the C and D portions of the regenerating load excitation curve R in FIG. 2.

To avoid excessive hunting in the spill-over regions, the spill-over circuits are adjusted so that each spill-over point is higher than any steady state torque load of the concerned sense that is applied to the motor, i.e., the spill-over point for the motoring mode is higher than any expected steady state motoring load, and the spill-over point for the regenerating mode is higher than any expected steady regenerating state load.

As hereinbefore noted, sufficient time delays are inserted in subchannels X1 and X2 to prevent motor oscillations or hunting during negative loads. These delays may for example be a .5 second time constant. The time delay delays the increase in field excitation caused by the regenerating load field reference signal in the torque compensator control.

It is to be understood that the herein described arrangements are simply illustrative of the principles of the invention, and other embodiments and applications are within the spirit and scope of the invention.

I claim as my invention:

1. In a control system for a synchronous motor having AC armature winding means and DC field winding means, signal providing means coupled to said motor for providing a signal that is a function of the motor load, and controllable field supply source means coupled to said signal providing means for supplying current to said field winding means in response to said signal, said field supply means being responsive to said signal to increase field current as a function of increasing motor load, said signal providing means including threshold means for causing the ratio of field current to motor load to increase when increasing motor load reaches a certain value.

2. In a control system for a synchronous motor having AC armature winding means and DC field winding means,
   (a) signal providing means coupled to said motor for providing a regenerating power signal that is a function of the load on the motor when the motor is regenerating, said signal providing means having a delayed response time, and
   (b) controllable field supply source means coupled to said signal providing means for supplying current to said field winding means in response to said signal, said field supply means being responsive to said signal to increase field current as a function of increasing regenerating load.

3. The combination as in claim 2 wherein said signal providing means includes threshold means for causing the ratio of field current to motor load to increase when increasing regenerating load reaches a certain value.

4. In control apparatus for a synchronous motor having AC armature winding means and DC field winding means,
   (a) first means coupled to said motor for providing a motoring power first signal that is a function of the load on the motor when motoring,
   (b) second means coupled to said motor for providing a regenerating power second signal that is a function of the load on the motor when the motor is regenerating, said first means having a faster response time than said second means, and
   (c) controllable field supply source means coupled to said first and second means for supplying current to said motor field winding means in response to said first and second signals, said field supply means being responsive to said first signal and to said second signal to respectively increase field current as a function of increasing motoring load and to increase field current as a delayed function of increasing regenerating load.

5. The combination as in claim 4 wherein said first means includes first threshold means for causing the ratio of field current to motor load to increase when increasing motoring load reaches a predetermined value, and wherein said second means includes second threshold means for causing the ratio of field current to motor load to increase when increasing regenerating load reaches a certain value.

6. The combination as in claim 4 wherein said first and second means include detector means which for motoring motor loads provides a signal of one polarity and for regenerating motor loads provides a signal of opposite polarity, and wherein one of said first and second means includes means for inverting one of said signals, and wherein said second means includes means for delaying said signal of opposite polarity, whereby signals applied by the first and second means to said controllable field source are of like polarity for the same values of motoring and regenerating motor loads.

7. The combination as in claim 6 wherein said second means comprises an inverting operational amplifier provided with a delay network.

8. The combination as in claim 1 wherein said signal providing means includes first and second parallel signal channels, the first channel including said threshold means, the second channel providing said signal until increasing motor load reaches a predetermined value, whereupon said threshold means responds to cause the first channel to augment said signal.

9. The combination as in claim 2 wherein said signal providing means includes means for causing the ratio of field current to motor load to increase when increasing regenerating load reaches a certain value.

10. The combination as in claim 3 wherein said signal providing means includes first and second parallel signal channels, the first channel including said threshold means, the second channel providing said regenerating power signal until increasing regenerating load reaches a certain value, whereupon said threshold means responds and the first channel augments said regenerating power signal.

11. The combination as in claim 4 wherein said first means includes means for causing the ratio of field current to motor load to increase when increasing motoring load reaches a predetermined value, and wherein said second means includes means for causing the ratio of field current to motor load to increase when increasing regenerating load reaches a certain value.

12. The combination as in claim 5 wherein said first means comprises first and second parallel signal channels, the first channel including said first threshold means, the second channel providing said first signal until increasing motoring load reaches a predetermined value, whereupon the first threshold means responds to cause the first channel to augment the first signal; and said second means comprises third and fourth parallel signal channels, the third channel including said second threshold means, the fourth channel providing said second signal until increasing regenerating load reaches a certain value, whereupon the second threshold means responds to cause the third channel to augment the second signal.

References Cited

UNITED STATES PATENTS

| | | | |
|---|---|---|---|
| 2,146,778 | 2/1939 | Swanson | 318—178 |
| 3,383,575 | 5/1968 | Bobo | 318—179 |
| 3,427,471 | 2/1969 | South | 318—179 XR |

ORIS L. RADER, Primary Examiner

G. Z. RUBINSON, Assistant Examiner

U.S. Cl. X.R.

318—179